United States Patent [19]

Peters et al.

[11] 4,032,669

[45] June 28, 1977

[54] CHEESE PRODUCT AND PROCESS FOR PRODUCTION

[75] Inventors: Joseph Jerome Peters, Timber Trails; Antonio Tong Villanueva, Marysville; Robert Samuel Keller, Columbus, all of Ohio

[73] Assignee: Societe d'Assistance Technique pour Produits Nestle S.A., Lausanne, Switzerland

[22] Filed: Dec. 20, 1974

[21] Appl. No.: 534,722

Related U.S. Application Data

[63] Continuation-in-part of Ser. No. 454,416, March 25, 1974, abandoned.

[52] U.S. Cl. .................................. 426/573; 426/582
[51] Int. Cl.² ......................................... A23C 19/12
[58] Field of Search ........... 426/573, 582, 654, 580

[56] References Cited

UNITED STATES PATENTS

| | | | |
|---|---|---|---|
| 3,726,690 | 4/1973 | Schuppner | 426/654 X |
| 3,726,990 | 4/1973 | Schuppner | 426/654 X |
| 3,843,808 | 10/1974 | Ziccarelli | 426/582 |

*Primary Examiner*—Raymond N. Jones
*Assistant Examiner*—R. A. Yoncoskie
*Attorney, Agent, or Firm*—Watson, Leavenworth, Kelton & Taggart

[57] ABSTRACT

A cheese food product is provided in concrete, chunky form particularly useful in salad dressings or as a garnish. The production of the present products may be performed by heating an admixture comprising natural cheese, Xanthomonas colloid, locust bean gum and casein or an edible caseinate salt, followed by chilling—to induce the formation of a gel matrix—and comminuting the solid product, as required, to appropriately sized granules.

10 Claims, No Drawings

CHEESE PRODUCT AND PROCESS FOR PRODUCTION

This application is a continuation-in-part of copending application Ser. No. 454,416 which was filed Mar. 25, 1974 and now abandoned.

INTRODUCTION TO THE INVENTION

This invention relates to the processing of raw or natural cheese and has particular reference to the production of a granular form of such cheese.

An object of the present invention is the provision of natural cheese in a form which can be stored under ambient conditions while retaining its utility as a cheese flavorant—for example, as an additive to salad dressings, dips and seasoning mixes or as a garnish on baked potatoes and convenience dinners.

Another object of the present invention is a method for providing natural or raw cheese in a relatively large, granular form of increased mechanical stability, while retaining the appearance and properties associated with the natural cheese.

The process of the present invention results in the production of chunks or crumble-like particles (hereafter termed "nuggets") of natural cheese or natural cheese in combination with other cheeses. In accordance with the present invention, such cheese is incorporated within a matrix gel formed from Xathomonas colloid and locust bean gum, in the additional presence of a firming agent comprising casein or an edible caseinate salt.

The present cheese nuggets differ from products available from the prior art in that, not only may they contain up to about 90% by weight of natural cheeses, but they are provided with a firm physical consistency imitative of the general appearance, eye appeal and mouthfeel of the naturally occurring cheeses of which they are composed.

DESCRIPTION OF THE INVENTION

The present invention is directed to the provision of granular cheese products which may be utilized as food garnishes or flavorants and which contain a predominant amount of a cheese constituent comprising natural cheese. By the term "natural", it is merely intended to describe a cheese which has not been drastically altered, for example, by spray-drying to yield a dehydrated product. Exemplary of cheeses useful in the present invention are Bleu, Swiss, Cheddar, Parmesan and Romano.

In addition, the cheese constituent may include a combination of natural cheeses in order to supply additional flavor to the present products. Also one or more dried cheeses may also be present. Such a dried cheese constituent, however, should desirably be present in no more than an amount equal to the weight of natural cheese, and more preferably, less than 30% thereof. Within these limits, the balance of different cheeses in the present nuggets may be varied. Optimum proportions are therefore best determined through simple taste testing.

Two gelling additives are utilized for providing the matrix within which the present cheese or cheeses are dispersed. These agents comprise Xanthomonas colloids (a hydrophilic Xanthan gum) and locust bean gum and constitute a composition well known in the prior art for its utility in producing heat reversible, aqueous gels. Thus, for example, this composition constitutes the subject matter of U.S. Pat. No. 3,557,016 of H.R. Schuppner, reference to which is made by incorporation herein for a more complete description of this facet of the present invention.

These two gel-forming agents are known to be operable in widely variant proportions. It has been discovered, however, that in the present invention, they should usually be employed within a colloid-gum ratio of from 1:5 to 4:1, respectively, and preferably within a ratio of from 1:2 to 3:2. The total amount of these agents required for formation of the present gel matrixes is very small. Thus, for example, total amounts of from about 0.2 to about 1.2% by weight of the total product are operable, although from about 0.4 to about 0.8% by weight is preferred.

the Xanthomonas colloids and locust bean gum produce a matrix through the formation of aqueous gels which are solid at temperatures below about 65° C. It is therefore necessary that at least about 30%, preferably from about 35 to 60% by weight of the present "nuggets" be composed of water in order that there be sufficient present to permit the formation of the matrix. The natural cheeses of the present products, however, normally contain sufficient naturally occurring water as to render the addition of this component unnecessary for appropriate gelation. Where, however, insufficient water is provided by the cheese constituent—for example, where a substantial portion of the cheese is provided in the form of a dried powder; where emulsifiers are utilized; or where more resilient consistency is desired—an additional amount may be separately provided.

Control of total water content in accordance with the present invention may be utilized to ensure the desired texture of the resultant nuggets. Thus, within the noted proportions, it has been discovered that higher concentrations of water yield a more gel-like or resilient consistency whereas lower concentrations result in harder and more crumbly nuggets. Accordingly, the incorporation of water in addition to that normally occurring in the cheese constituent, or conversely the removal of water by partially drying the cheese, permits adaptation of nugget texture to a predetermined state.

The total water content has also been discovered to be of importance for a completely different reason—viz. storage stability of the product nuggets. Within the preferred from 35 to 60% aqueous content, the present nuggets contain sufficient solute to prevent adverse growth of many microorganisms. This ability of the present products—which might otherwise be a suitable growth media for bacteria etc.—to resist microorganism growth, may be defined by the following parameter:

$$A_w = \text{water activity of cheese nuggets at a given temperature, t} = \frac{\text{water vapor pressure over nuggets at t°}}{\text{water vapor pressure over pure water at t°}}$$

Accordingly, it has been determined that where the $A_w$ for the present products is less than 0.90, preferably less than 0.88, they will exhibit substantial resistance to most microorganism growth—even in the absence of chemical preservatives—so as significantly to enhance the storage ability of the present product.

Although it might have been expected—based on the known properties of the present gelling additives—that useful products having a desirable consistency could be obtained simply through the incorporation of natural cheese within a matrix comprising an aqueous gel of Xanthomonas colloids and locust bean gum, such has not proven to be the case.

Only dried, as opposed to natural, cheeses are known to permit such a straightforward gelation. Where certain natural cheeses-for example, Bleu cheeses—are incorporated into this Xamthomonas and locust gel, it has proven impossible to adjust the proportions of ingredients to provide a firm, coherent gel. Instead, only a soft, mush-like product, which is totally unsuitable for use in accordance with the present invention, results. Other classes of natural cheeses—such as Swiss, Romano, Parmesan or Cheddar—can be gelled into firm matrix form with only these two additives. Even these latter cheese products have not, however, proven useful, because they have been discovered to lack gel stability and—despite their initial appearance of utility—are subject to considerable release of oil and/or water in even minimal storage time.

Upon further examination of the natural cheese-gel system, however, it was found that the additional incorporation of casein or an edible caseinate salt—for example, sodium or potassium caseinate—will transform the soft, mushy admixtures resultant from utilizing natural cheeses of the first of the foregoing classes into firm, coherent products and will stabilize all these natural cheese gels against release of coil and water.

Why the present gelling agents act so uniquely in the presence of natural cheese and by what mechanism casein or caseinate operates to correct their effect remain unknown. Consequently, no explanation of these phenomena is provided. It has, however, been discovered that even where soft-gelling cheeses are utilized, from about 10 to 30%, preferably from about 15 to 25% of casein and/or caseinate ion by weight of natural cheese produces a matrix having the desired properties is obtained. For the other class of cheeses— those which permit an initial firm gel with only Xanthomonas and locust bean gum—adequate stability is provided within this range and also by lower amounts of down to about 5% by weight of natural cheese.

Where these soft and firm gelling cheeses are utilized together, the total amount of requisite casein or caseinate can be calculated from the foregoing ranges having regard to the amount of each class of cheese present. Thus, these mixed products normally contain from about 5 to 30% casein or caseinate by weight of natural cheese.

Within the foregoing range, the amount of firming agent may be varied in order to obtain any particular, desired consistency. Further, certain optional additional ingredients of the present invention may affect this parameter. Thus, for example, the presence of powdered cheese—such as spray dried cheese—ordinarily permits the use of amounts of casein or caseinate within the lower portions of the range. These modifications involve only the optimizations of various embodiments of the present invention, however, and are within the ordinary skill in the art, once a particular such embodiment has been selected.

Numerous additional ingredients have been discovered which, where incorporated in the present nuggets, are useful for the purpose of further enhancing their desirability. Thus, for example, the hydrogen ion concentration of the present composition may be increased so as to provide bacteriocidal activity and a desirable flavor enhancement. Ordinarily, this is accomplished by dispersing sufficient lower alkyl organic acid within the present composition to reduce the pH to at least 6.0, preferably to at least about 5.0. Many such bacteriocidal acids are well known in the art; however, it is preferred that the agent be selected having regard to any flavor it might impart. Thus, for example, lactic acid has been determined to be most efficacious.

The utilization of organic acids as bacteriocidal agents has, however, been found to have definite limits of desirability. Thus, it has been discovered that higher concentrations of acid may adversely affect the firmness of the present gel matrix. Additionally, the products may become undesirably tart. Consequently, it is most preferable that the amount of organic or other acid employed reduce the pH of the present nuggets to no lower than 4.0, preferably no lower than about 4.7.

Additional preservatives may also be incorporated within the present composition. Thus, for example, mold inhibitors—such as benzoates, sorbates, propionates, etc.—and additional bacteriocidal agents may be utilized so as to ensure that the present nuggets will resist the conditions normally incident to storage of food products. Further optional ingredients include emulsifiers—such as are well known in the art—utilized in amounts of from about 0 to 0.5%, preferably about 0.2% by total weight, in order to enhance the homogeneity of the present composition. Finally, condiments—such as salt—various cheese flavorants, and coloring materials may be employed to heighten the appearance and flavor of the present cheese compositions.

A further advantage of these additional ingredients is that each adds to solute concentration of the water in the present nuggets. Accordingly, they help to depress the above-mentioned water activity of product and so increase its resistance to microorganism growth.

The production of the present nuggets may be performed through a process which is considerably simpler than those by which prior art cheese granules have customarily been produced. Notably, too, the simplfication in the number of steps required in accordance with the present process—with attendant reduction in critical processing parameters—constitutes yet another advantage of the present invention.

The formation of the present gel matrix requires that the constituents intended for incorporation within the present nuggets pass through an essentially molten stage. Accordingly, appropriate amounts of the natural cheese—and where desired, additional dried cheese—the present gelling agents and any of the optional ingredients to which reference has been made herein should be intimately admixed at a temperature of from about 65° to 120° C, more usually a temperature between 77° and 100° C. Ordinarily, the actual temperature utilized will be at or close to the melting point of the natural cheese present. Thus, it may vary—depending upon the particular cheese or cheese utilized. Also, it is desirable to minimize the adverse effects of heating on the cheese constituents, and thus lower temperature within the above ranges are most desirable.

This mixing-melting step may be performed in various apparati readily available in the prior art. It is preferred, however, than an apparatus such as a steam-jacketed mixer be employed so as to permit the careful control of temperature. This is of particular importance where, for example, the eventual texture of the nuggets is to be determined through control of the moisture content in the eventual product. Accordingly, after determination of the initial moisture content of the cheese constituent, additional water may be added to, or initial water evaporated from, the present starting materials so as to achieve any particular, desired moisture content.

After the initial ingredients have been melted and the appropriate moisture content reached, they should be quickly chilled so as to achieve a product temperature of from less than 10° C, to not less than the freezing point of the product, preferably from about 3° to 8° C. This chilling step should be performed within a short time after the natural cheese ingredients are first subjected to elevated, melting temperatures. This is desirable because long exposure of the cheese ingredients of the present composition to such temperatures may result in denaturing of the cheese protein and, in certain cases, separation of oil from the remainder of the ingredients.

Further, in order to maintain the present composition in intimately dispersed form, the molten ingredients should be chilled in as short a time as possible. Thus, the chilling step should preferably cause solidification of the composition in less than three minutes, preferably less than about one minute. In this manner, the homogeneity of the resultant nuggets, and even the resistance to syneresis, may be heightened.

As the cheese is reduced in temperature, the gel matrix of the present invention sets to provide a firm, solid product. This solid product may, at any convenient time, be further subjected to comminution. In this manner, and utilizing cutters and slicers readily available in the art, granular products, or nuggets, are provided having readily utilizable form.

It is optionally desirable if, in accordance with the foregoing process of production, the homogeneity of the present composition is further ensured. Although such homogeneity can—to large extent—be provided through the utilization of chemical emulsifying agents, in a preferred embodiment of the present invention at least some of the ingredients are passed through a homogenization zone, preparatory to the above-indicated mixingmelting step. Homogenization—which can be performed utilizing prior art technique—is most advantageous where utilized to disperse at least the natural cheese constituent, casein or caseinate, emulsifier and any additional water intended for incorporation. After the resultant composition has been liquified—by melting at the previously indicated temperature—and homogenized, it may then be united with the remaining components of the present invention in the meltermixer. Although some of the other components may also be present in the homogenized slurry, the gelling additives are preferably not so treated. Also, as dried cheese—where utilized as part of the cheese constituent—is desirably added as a readily dispersable powder, this component too, is most simply added at the melting stage.

In addition to their utility per se, as an additive to salad dressings, dips and as otherwise indicated above, the nuggets of the present invention are also particularly useful in embodiments in which they may be subjected to heating. Thus, for example, they may be sprinkled onto the surface of casseroles, etc. and, incident to high temperature baking, will melt and garnish a food dish in the same manner as natural cheeses.

In a further, particularly preferred embodiment of the present invention, however, the temperature stability of the present gel matrixes is relied upon to provide products not heretofore available with natural cheese or prior art substitutes. Thus, these nuggets may be incorporated into foodstuffs which are later heated without destroying their discrete, shaped appearance therein. In contrast, other products normally melt at even minimal temperatures. Thus, they not only lose their appearance but additionally, cannot normally be maintained in any particular location within a foodstuff.

Accordingly, foodstuffs which are normally subjected to heat sterilization (for example, in the can or immediately before packaging) have not ordinarily been susceptible to flavoring with cheese constituents of, or similar to, natural cheese. Such constituents have heretofore exhibited low melting points which would have resulted in the constituents assumption of a coagulated mass in the eventual product.

The problem is overcome through the use of the present nuggets, however. Normal heat treatments—such as sterilization—do not subject a foodstuff to sufficiently high temperature and time condition as to result in melting and loss of shape of the present nuggets. Accordingly, such diverse products as soups, pizza sauces, and pates may be provided with natural cheese flavorings before sterilization and without adverse effect to their appearances.

In similar manner, even many cooked or precooked foodstuffs may advantageously be garnished with the present nuggets. Thus the resistance to liquification by melting evidenced by these products permits their use as a filler and/or flavorant for incorporation within many foodstuffs.

One example of such foodstuffs is luncheon meats. It has long been sought to provide mixed patties, slices or loaves of meat products which contain natural cheese. Unfortunately, where such products were attempted in the past, the incorporated cheese constituent melted during cooking of the product, ran out of the meat, and would later congeal as an unsightly and unappetizing mass.

In accordance with the present invention, however, meat and cheese nuggets can be agglomerated and cooked without displacement of the cheese constituent. Instead, the product will, in cross-section, exhibit the nugget shapes and positioning held in the original agglomerate, thus enhancing the appearance of the meat product while obviating the need for garnishment with separately procured and treated slices or crumbles of cheese.

Where—as described hereinabove—it is desired to maintain the discrete shaped form of the present nuggets within a foodstuff, it is necessary only to avoid melting. This is easily accomplished by controlling the temperature and/or time of sterilization, cooking, etc. below that at which the nuggets are liquified. Conversely, if melting is desired—as where, for example, the nuggets are intended to be converted into a topping which evenly coats a product—higher temperatures for a time sufficient to ensure melting—as previously described in connecting with the mixing-melting step for forming nuggets—is also easily accomplished.

In order more clearly to disclose the nature of the present invention, examples are hereinafter described. It should be understood, however, that this is done solely by way of example and is not intended either to delineate the scope of the present invention nor to limit the ambit of the appended claims. In the examples and throughout the specification, percentages are intended to refer to percent by weight of total composition, unless otherwise specified.

EXAMPLE NO. 1

Utilizing a mixer provided with a steam jacket maintained at a temperature of 100° C, an admixture comprising:

| Ingredients | Total Weight |
| --- | --- |
| Disodium Phosphate | 20 Kg. |
| Xanthomonas Hydrophilic Colloid* | 3 Kg. |
| Locust Bean Gum | 3 Kg. |
| Potassium Sorbate | 1 Kg. |
| Sodium Chloride | 10 Kg. |
| Lactic Acid (50% Aqueous Solution) | 20 Kg. |
| Sodium Caseinate | 100 Kg. |
| Natural Bleu Cheese | 517 Kg. |
| Natural Cheddar Cheese | 318 Kg. |
| Water | 20 kg. |

*(A Xantham gum sold under the name "Keltrol" by The Kelco Company)

is heated to a temperature of 90° C under conditions of high shear mixing. After twenty minutes the molten solution is slowly pumped through nozzles onto a continuous freezing belt maintained at −25° C. The rates of the belt and of pumping are balanced so as to provide strands of material which are about 0.6 cm in diameter. On the belt, the strands solidify within about 1 to 2 seconds. After the resultant, firm gels reach a temperature of 5° C they are removed from the belt and conveyed to a cutter. There the strands are cut into cylindrical nuggets having a length of 0.6 cm. These nuggets have a total moisture content of about 38%, a pH of 4.9, and are characterized by the slightly crumbly consistency normally associated with natural Blue cheese.

The nuggets are then subjected to storage stability testing in an oven maintained at a temperature of 40° C. Even after 2 weeks, there is no apparent release of water or oil from the nugget matrixes.

EXAMPLE NO. 2

The process of Example 1 is repeated with substitution of 800 Kg. of natural Parmesan for the Bleu and Cheddar natural cheese constituents (Sample A) and with such substitution and the deletion of the sodium caseinate firming agent (Sample B).

Nuggets produced from runs of both samples are observed to be firm and dry to the touch immediately after being cut to 0.6 cm. length and warming to room temperature. The nuggets are then placed in clear sealed plastics pouches in an oven maintained at 25° C and checked at 24 hour intervals for 7 days. The nuggets resultant from Sample A maintained their desirable initial texture and appearance. After only one day, however, the nuggets of Sample B exhibited a wettened appearance and after 3 days, sufficient free liquid had collected in the bottom on the pouch to evidence the failure of the gelling agents, alone, in providing a stable product gel.

EXAMPLE NO. 3

The process of Example 1 is repeated with substitution of 600 Kg. of natural Cheddar cheese and 200 Kg. of spray-dried Romano cheese powder for the natural cheese constituents (Sample A') and with such substitution and the deletion of the sodium caseinate firming agent (Sample B').

Immediately after cutting and warming to room temperature, the nuggets of Sample A' are firm and dry in texture and appearance. The composition of Sample B', however, was significantly less firm and tended to congeal. (Moreover, even at a temperature of 2° C, the strands of extrudate had exhibited poor clevage incident to cutting.) Further, upon storage at 25° C, while the nuggets of Sample A' resisted syneresis and oiling-off, the composition of Sample B' showed separation of a clear liquid phase within less than two days.

EXAMPLE NO. 4

The process of Example 1 is repeated substituting 835 Kg. of natural Cheddar cheese for the cheese constituent therein. The resultant nuggets are then compared with natural cheese cut to similar dimensions by incorporating them into separate meat-cheese loaf products.

These products are formed by admixture of a coarse ground composition:
0.35 kg. of cured beef trimmings
0.35 kg. of cured pork trimmings
with an emulsified composition:
0.20 kg. of beef trimmings
0.30 kg. of pork trimmings
0.10 kg. of
0.05 kg. of white pepper
0.10 kg. of ice
following which, 0.10 kg. of the above cheddar nuggets are added to one-half of the admixture and 0.10 kg. of natural cheddar cheese to the second half.

Separate loaves are prepared from the halves, placed on aluminum trays and baked in an oven at 175° C for 3 hours. During baking, the loaves reach an internal temperature of about 75° C.

After removal from the oven, the appearances of the two loaves are observed to be different. The nuggets of the first loaf have maintained their pre-baking configuration and constitute discrete shaped volumes both cross-sectionally and where they appear on the loaf surface. In contrast, the natural cheese added to the second loaf is observed to have melted and run through that loaf and consequently present largely at the bottom of the loaf and baking pan in a recongealed, essentially continuous mass of unpleasant appearance.

We claim:

1. An edible product in the form of granules and comprising natural cheese dispersed within an aqueous gel matrix of Xanthomonas colloid and locust bean gum, said edible product being stabilized with from 5 to 30% by weight of said natural cheese of a firming agent selected from the group consisting of casein and an edible caseinate salt, said edible product having the firm, physical consistency of said natural cheese.

2. The product of claim 1, wherein the Xanthomonas colloid and locust bean gum are present in a ratio between about 1:5 to 4:1, respectively, and in a total amount of from about 0.2 to 1.2% by weight of product.

3. The product of claim 2, wherein the cheese consists essentially of natural Bleu cheese, and the firming agent is present in an amount of from about 10 to 30% by weight of said natural cheese.

4. The product of claim 2, wherein dried cheese is additionally present in an amount less than the weight of natural cheese.

5. The product of claim 1, wherein the moisture content is at least about 30% by total weight.

6. The product of claim 1, wherein the pH is within the range of from about 4.0 to 6.0.

7. The product of claim 3, wherein the moisture content is at least about 30% by total weight.

8. The product of claim 3, wherein the pH is within the range of from about 4.0 to 6.0.

9. A process for producing the product of claim 1 which comprises heating an admixture of natural cheese, Xanthomonas colloid, locust bean gum and a firming agent selected from the group consisting of casein and an edible caseinate salt to a temperature of from 65° to 120° C, intimately blending said admixture, chilling said admixture to less than about 10° C but not less than the freezing point of the admixture and comminuting the chilled admixture to produce a product in the form of granules.

10. The process of claim 9, wherein the product in the form of granules is dispersed within a foodstuff, said foodstuff is subjected to heating sufficient to effect sterilization or cooking but insufficient to melt the dispersed product, and then said foodstuff is cooled.

* * * * *